(12) United States Patent
Anderson et al.

(10) Patent No.: US 11,821,781 B2
(45) Date of Patent: Nov. 21, 2023

(54) APPARATUS AND METHOD FOR DETERMINING WEIGHT DISTRIBUTION

(71) Applicant: Progress Mfg. Inc., Provo, UT (US)

(72) Inventors: Jed K. Anderson, Lindon, UT (US); David F. Lundgreen, Spanish Fork, UT (US); Jason R. Harper, Spanish Fork, UT (US)

(73) Assignee: Progress Mfg. LLC, Provo, UT (US)

( * ) Notice: Subject to any disclaimer, the term of this patent is extended or adjusted under 35 U.S.C. 154(b) by 463 days.

(21) Appl. No.: 16/933,767

(22) Filed: Jul. 20, 2020

(65) Prior Publication Data

US 2022/0018703 A1 Jan. 20, 2022

(51) Int. Cl.
*G01G 19/02* (2006.01)
*G01G 19/40* (2006.01)
(Continued)

(52) U.S. Cl.
CPC .............. *G01G 19/02* (2013.01); *B60D 1/58* (2013.01); *G01G 9/005* (2013.01); *G01G 19/40* (2013.01)

(58) Field of Classification Search
CPC ........ G01G 19/02; G01G 19/40; G01G 9/005; G01G 19/08; B60D 1/58; B60D 1/247; B60D 1/248; B60D 1/62; G01M 1/12
See application file for complete search history.

(56) References Cited

U.S. PATENT DOCUMENTS 4,691,792 A 9/1987 Shintani
5,610,372 A 3/1997 Phillips et al.
(Continued)

FOREIGN PATENT DOCUMENTS

CN 106840020 A 6/2017
DE 4204066 A1 8/1993
(Continued)

OTHER PUBLICATIONS

Amazon Listing "Better Weigh," accessed at https://www.amazon.com/CURT-51701-BetterWeigh-Smartphones-Distribution/dp/B08IFTQCYN, dated May 20, 2020, 7 pages.
(Continued)

*Primary Examiner* — Eyob Hagos
(74) *Attorney, Agent, or Firm* — Morriss O'Bryant; COMPAGNI CANNON, PLLC

(57) ABSTRACT

A weight distribution measurement system includes a portable measuring device configured to measure a linear distance and store a plurality of measurements. The portable measuring device is also configured to measure a first distance between a first location on a vehicle supported by an axle of the vehicle and a second location, wherein the first distance is measured prior to loading the vehicle. The portable measuring device is also configured to measure a second distance between the first location and the second location, wherein the second distance is measured after loading a vehicle. And the portable measuring device can measure a third distance between the first location and the second location, wherein the third distance is measured after loading a vehicle and after a weight distribution mechanism has been engaged, and then calculate the percent weight distribution over the axles of the vehicle using the portable measuring device and display the percent weight distribution.

22 Claims, 8 Drawing Sheets

(51) Int. Cl.
  *G01G 9/00* (2006.01)
  *B60D 1/58* (2006.01)

(56) References Cited

U.S. PATENT DOCUMENTS

| | | | | |
|---|---|---|---|---|
| 6,203,045 | B1* | 3/2001 | Kyrtsos | B62D 53/0814 |
| | | | | 280/438.1 |
| 6,921,100 | B2 | 7/2005 | Mantini et al. | |
| 7,072,763 | B2 | 7/2006 | Saxon et al. | |
| 7,818,140 | B2 | 10/2010 | Dreier et al. | |
| 7,897,884 | B2 | 3/2011 | Harish | |
| 8,115,609 | B2 | 2/2012 | Ketari | |
| 9,085,203 | B2* | 7/2015 | Duppong | B60C 23/0408 |
| 9,290,185 | B2 | 3/2016 | Hall | |
| 9,327,566 | B2 | 5/2016 | McAllister | |
| 9,738,125 | B1* | 8/2017 | Brickley | B60D 1/62 |
| 9,816,813 | B2 | 11/2017 | Lettau et al. | |
| 9,870,653 | B1 | 1/2018 | Fritz et al. | |
| 10,126,755 | B1 | 11/2018 | Avi et al. | |
| 10,377,196 | B2 | 8/2019 | Brickley et al. | |
| 11,623,484 | B2* | 4/2023 | Hall | B60D 1/62 |
| | | | | 280/402 |
| 11,724,554 | B2* | 8/2023 | Hall | B60D 1/247 |
| | | | | 280/407 |
| 2003/0155164 | A1* | 8/2003 | Mantini | B60G 17/005 |
| | | | | 180/209 |
| 2007/0296173 | A1* | 12/2007 | Regnell | B60G 17/0152 |
| | | | | 280/124.1 |
| 2014/0156524 | A1 | 6/2014 | Ruud et al. | |
| 2015/0053487 | A1 | 2/2015 | Cash | |
| 2017/0314986 | A1* | 11/2017 | Dyal | B62D 53/061 |
| 2019/0258244 | A1 | 8/2019 | Kaiser | |
| 2019/0391590 | A1* | 12/2019 | Niewiadomski | G01L 5/136 |
| 2020/0070357 | A1* | 3/2020 | Nakayama | B25J 13/085 |
| 2020/0262257 | A1* | 8/2020 | Köster | B60D 1/62 |
| 2021/0094370 | A1* | 4/2021 | McAllister | B60D 1/06 |

FOREIGN PATENT DOCUMENTS

| | | |
|---|---|---|
| DE | 102018214885 A1 * | 3/2020 |
| WO | WO9745279 | 12/1997 |
| WO | WO2015171825 | 11/2015 |
| WO | WO2016127058 A1 | 8/2016 |

OTHER PUBLICATIONS

Ebay Listing "AppWeigh Bluetooth Onboard etc . . . ," accessed at https://www.ebay.com/i/333144142565?chn=ps&norover=1&mkevt=1&mkrid=711-117182-37290-0&mkcid=2&itemid=333144142565&targetid=883687 . . . , dated May 21, 2020, 3 pages.

Natda New Smartphone-Ready Vehicle/Trailer Scale with TowSence Technology, accessed at https://www.natda.org/news/new-smartphone-ready-vehicle-trailer-scale-with-towsense-technology/, dated May 20, 2020, 3 pages.

RV News "Curt Launches Bluetooth Mobile Towing Scale," accessed at https://www.rvnews.com/curt-launches-bluetooth-mobile-towing-scale/, dated May 20, 2020, 4 pages.

Safiery "Know Your Tow," accessed at https://www.safiery.com/towing-safety, dated May 21, 2020, 3 pages.

True Tow Technology, accessed at https://www.weigh-safe.com/product/true-tow-weight-distribution-hitch/, dated May 22, 2020, 6 pages.

Weight Distribution Hitch Features and Benefits, accessed at https://www.weigh-safe.com/towing-safety/weight-distribution-hitch-features-and-benefits/, dated May 21, 2020, 8 pages.

Worktruck "BetterWeigh Mobile Towing Scale Measures in Real-Time", accessed at https://www.worktruckonline.com/350432/betterweigh-mobile-towing-scale-measures-in-real-time, dated May 20, 2020, 2 pages.

* cited by examiner

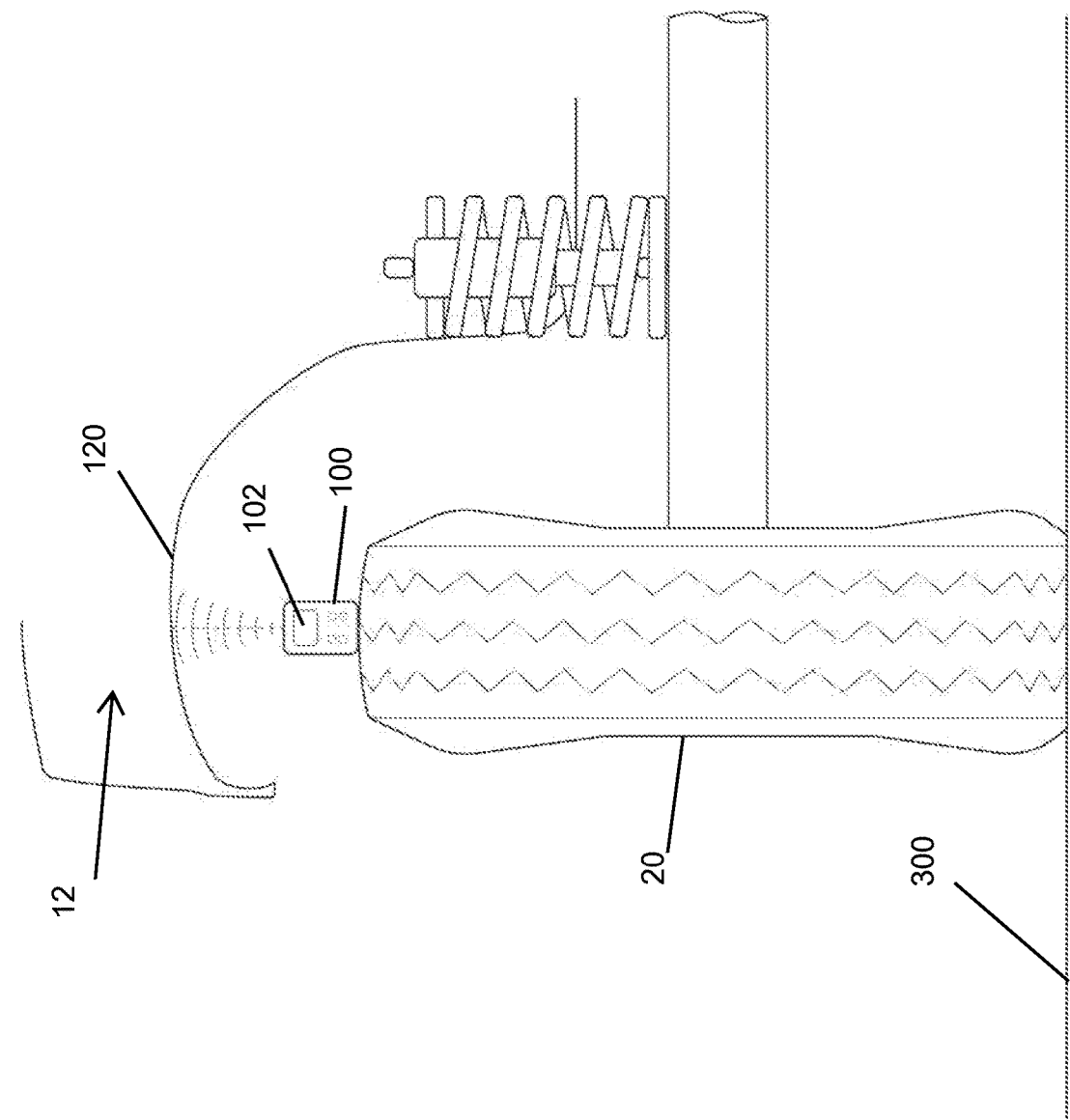

APPARATUS AND METHOD FOR DETERMINING WEIGHT DISTRIBUTION

CROSS-REFERENCE TO RELATED APPLICATIONS

Not applicable.

STATEMENT REGARDING FEDERALLY SPONSORED RESEARCH OR DEVELOPMENT

Not Applicable.

BACKGROUND

1. The Field of the Present Disclosure.

The present disclosure relates generally to trailer weight distribution hitch systems, and more particularly, but not necessarily entirely, to trailer hitch systems for measuring the weight and resulting forces exerted by a trailer while using a weight distribution mechanism.

2. Description of Related Art.

It should be appreciated that the correct balance of a trailer load is necessary for safe towing. When towing a trailer, the tow vehicle often sags in the rear and raises in the front. The weight of the trailer on the rear of the tow vehicle can cause the rear tires and axle to carry a significant majority of the percent of the load of the trailer tongue, as known as tongue weight, and can also result in a transfer of some of the weight from the front of the tow vehicle itself, to the rear axle of the tow vehicle. This unbalanced loading can cause an unsafe driving situation.

Unbalanced loading can reduce steering and braking capabilities in the tow vehicle and in extreme situations it can cause accelerated wear to the mechanical components of the tow vehicle and trailer, and compromise the performance of the tow vehicle.

To aid in mitigating this type of unbalanced loading, people often purchase hitches that transfer the trailer tongue weight from the rear axle of the tow vehicle back to the front axle of the tow vehicle. However, it can be difficult for a user to know if they have achieved correct weight distribution. Further, as trailers are constantly being loaded differently, a previously correct weight distribution setup may not remain optimal and need to be reevaluated and adjusted accordingly.

The prior art is characterized by several disadvantages that may be addressed by the present disclosure. The present disclosure minimizes, and in some aspects eliminates, the failures of the prior art, by utilizing the system and components described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIG. 8 is front view of another embodiment of a disclosed portable measuring device positioned at a fixed position on a ground supported surface, such as a tire.

DETAILED DESCRIPTION

Figure 1:
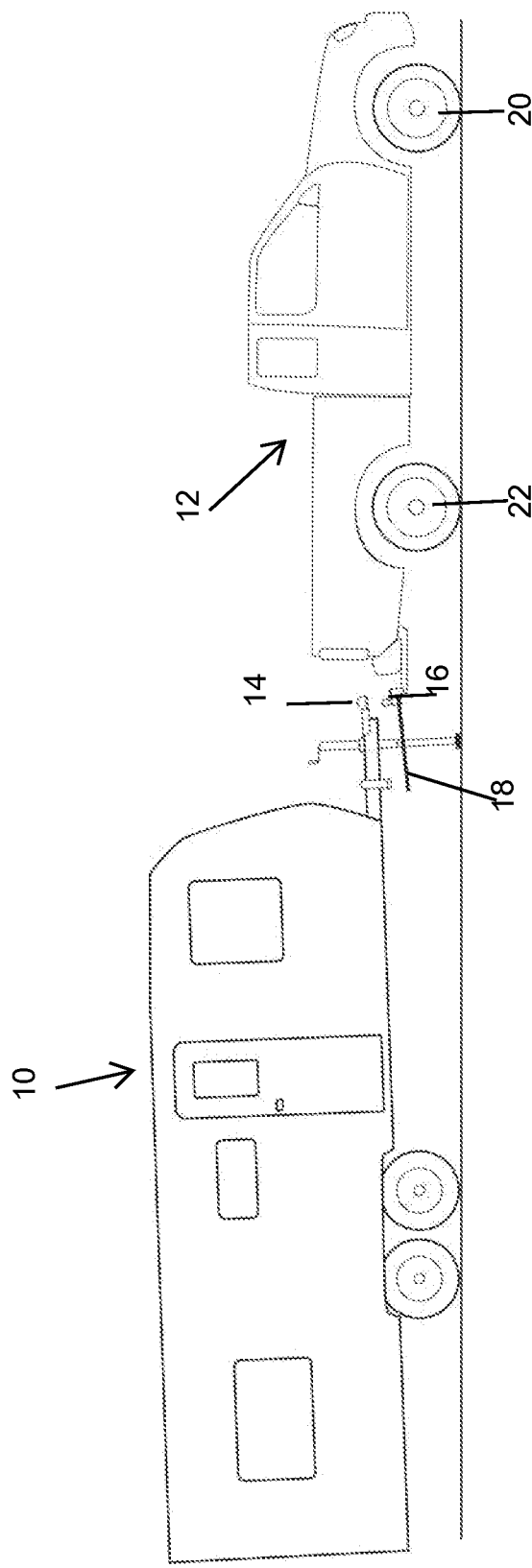
FIG. 1 is a side view of a tow vehicle and a trailer prior to loading the tow vehicle.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "having," "containing," "characterized by," and grammatical equivalents thereof are inclusive or open-ended terms that do not exclude additional, unrecited elements or method steps.

Applicant has discovered an improved system and method for determining weight distribution of a trailer after being loaded on a tow vehicle and after engaging a weight distribution mechanism.

The generally accepted safe and proper tongue weight is roughly 10 to 15 percent of the total loaded trailer weight. The load of a trailer should also be properly balanced to achieve a tongue weight within the safe and proper range. Applicant has discovered a system and method configured to measure the weight distribution of the trailer, which can greatly reduce unsafe towing by providing users an effective mechanism configured to measure tongue weight distribution and properly transferring or redistributing the load of the trailer across the tow vehicle and trailer axles.

Figure 2:
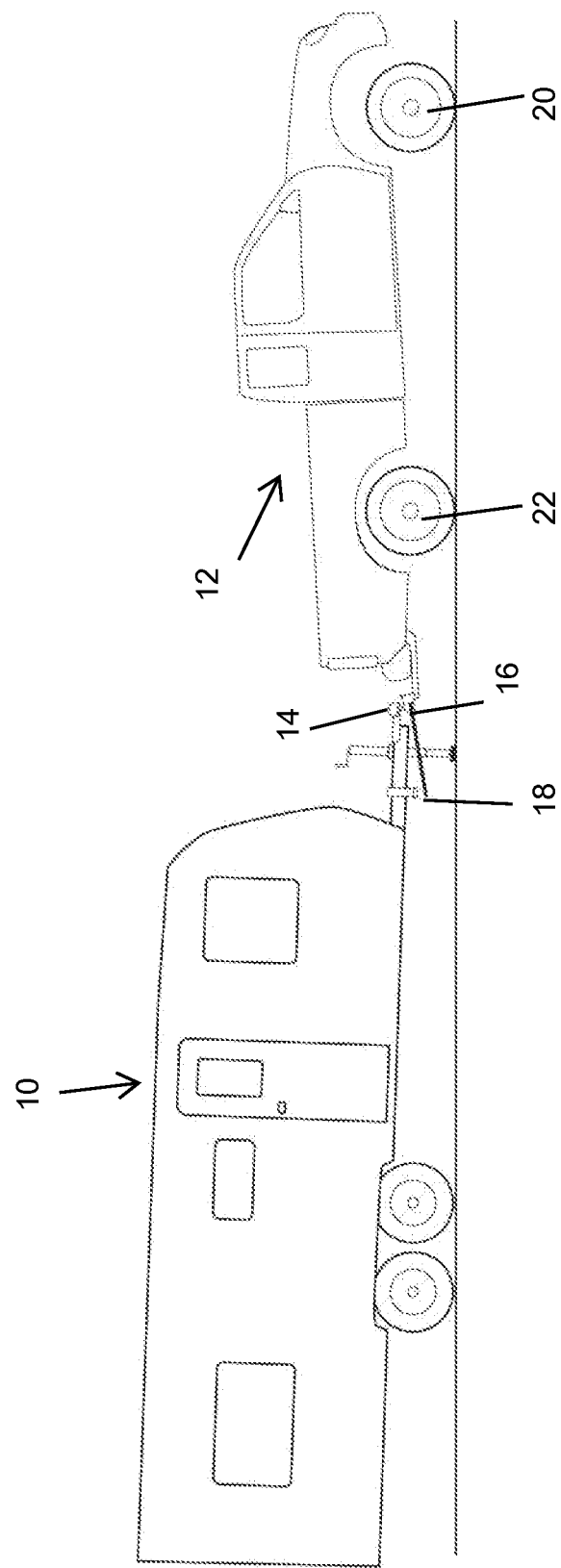
FIG. 2 is a side view of a tow vehicle and a trailer after the tow vehicle has been loaded with the trailer.
Figure 3:
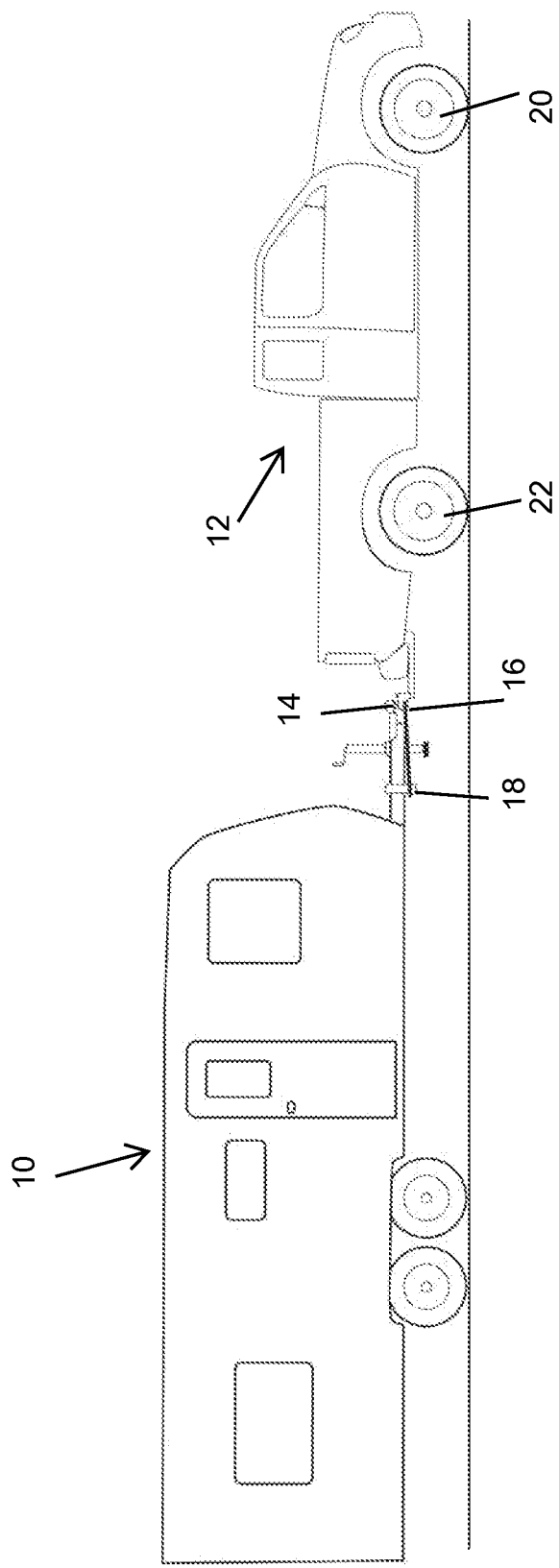
FIG. 3 is a side view of a tow vehicle and a trailer after the tow vehicle has been loaded with the trailer and after a weight distribution device has been engaged between the tow vehicle and the trailer.

FIG. 1-3 illustrates three basic load positions for accurately measuring and determining weight distribution of a load on a tow vehicle. Specifically, FIG. 1 illustrates a trailer 10 and a tow vehicle 12. The trailer 10 includes a tongue 14 configured to receive a trailer hitch 16 attached to the tow vehicle 12. The trailer hitch 16 may also include a weight distribution mechanism 18 designed and configured to more evenly distribute the load of the trailer 10 over the axles of the tow vehicle 12, as opposed to placing most of the load of the trailer's tongue weight on the rear axle of the tow vehicle 12. FIG. 1 illustrates the trailer 10 and tow vehicle 12 before the trailer 10 is loaded onto the tow vehicle 12. Also shown in FIG. 1 is that the tow vehicle 12 at a base line, meaning the chassis of the vehicle is substantially balanced between the front wheels 20, or front axle, and the rear wheels 22, or rear axle.

FIG. 2, illustrates the trailer 10 and tow vehicle 12 after the trailer 10 is loaded onto the tow vehicle 12, but before engagement of the weight distribution mechanism 18. Also shown in FIG. 2 is the tow vehicle 12 in a loaded state, meaning the trailer hitch 16 and rear wheels 22 may be holding the substantial majority of the tongue weight of the trailer 10, causing the chassis of the vehicle 12 to substantially tilt toward the rear of the vehicle 12, causing the front of the vehicle 12 to raise up from the front wheels 20, or front axle.

FIG. 3, illustrates the trailer 10 and tow vehicle 12 after the trailer 10 is loaded onto the tow vehicle 12, and after engagement of the weight distribution mechanism 18. Also shown in FIG. 3 is when the weight distribution mechanism 18 is engaged, the weight of the trailer 10 is more evenly distributed over the axles of the chassis of the vehicle 12, resulting in the front of the chassis of the vehicle 12 to be closer to level with respect to the front wheels 20 and rear wheels 22.

As shown in FIGS. 4-8, the disclosed weight distribution measurement system may include a portable measuring device 100. The measuring device 100 may be electronic and configured to measure a linear distance between two objects or surfaces. The measuring device 100 may measure the linear distance by utilizing a laser, which may be visible, or infrared, ultrasonic waves, or any other known measuring implement. The measuring device 100 may also include an electronic memory capable of storing multiple measured distances. Additionally, the measuring device 100 may be configured to take a single or multiple measurements at a first location and load status and then average the measurements together to provide a more accurate final measurement for any given location and load status.

The measuring device 100 may also include an operating system capable of being programed to perform calculations utilizing the stored measured distances. The measuring device 100 may also include a visual display 102, that may display measured distances or resultant calculations. Additionally, the measuring device may be configured to transmit or share data, such as measured distances and/or output calculations, via WiFi, RF, Bluetooth, hardwire or other known electronic transmission mechanism or device.

A disclosed method of measuring weight distribution may include using the portable measuring device 100 to measure and store a first measurement of the tow vehicle, which may be a baseline measurement of the front axle load of the unloaded tow vehicle 12, such as two points or surfaces that may represent the height of a front end of the tow vehicle 12.

After the tow vehicle 12 has been loaded with a trailer 10, but before the weight distribution mechanism 18 is engaged, a second measurement may be taken and stored by the portable measuring device 100. The second measurement is taken at substantially the same location and between the same two points or surfaces as the first measurement.

After the weight distribution mechanism 18 is engaged, a third measurement maybe be taken and stored by the portable measuring device 100. The third measurement is taken at substantially the same location and between the same two points or surfaces as the first and second measurements.

The portable measuring device 100 may then calculate a percentage of the trailer 10 weight being distributed over the axles of the tow vehicle 12, also known as percent weight distribution. The calculation for percent weight distribution (% WD) is: % WD=(Second measurement−Third measurement)/ (Second measurement−First measurement). In another embodiment, % WD=(Second measurement taken on a driver side of the vehicle+Second measurement taken on a passenger side of the vehicle−Third measurement taken on a driver side−Third measurement taken on a passenger side)/(Second measurement taken on a driver side of the vehicle+Second measurement taken on a passenger side of the vehicle−First measurement taken on a driver side of the vehicle−First measurement taken on a passenger side of the vehicle), which substantially equates to an average weight distribution of a driver and passenger side of the vehicle 12.

While the first, second and third measurements (unloaded, loaded and weight distributed) are recited sequentially above, the measurements may be taken and stored in any desired order. For the most accurate and consistent measurements, both the trailer 10 and tow vehicle 12 should be positioned and supported on a level ground surface.

After the portable measuring device 100 performs the percent weight distribution, the portable measuring device 100 may then display on the visual display 102 or communicate to an external device (such as a phone, computer, etc.) the percent weight distribution. The communication can be via Bluetooth, RF, WiFi, or wired connection. Alternatively, the portable measuring device 100 may also, or instead, calculate and display a factor or amount of weight being distributed.

Figure 4:
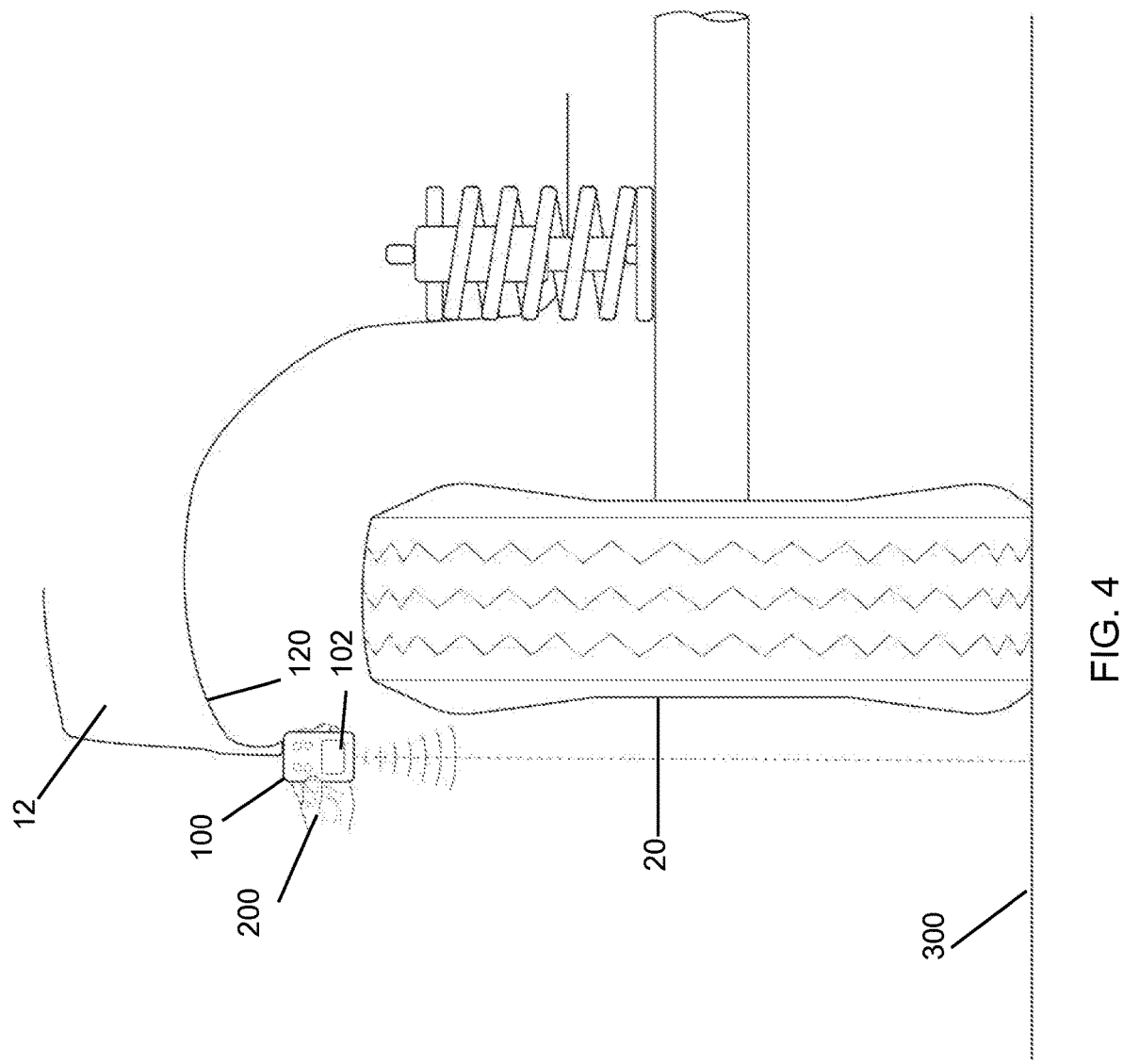
FIG. 4 is front view of an embodiment of a disclosed portable measuring device held at a fixed position on the vehicle.

Referring to FIG. 4, the portable measuring device 100 may be held by a user 200 at a location on a front end of the tow vehicle 12, for example, at an interior location on the wheel well 120. The portable measuring device 100 can then be pointed toward the ground or ground surface 300, to measure the distance between the location on the wheel well 120 and the ground, or at a target positioned on the ground, or at any surface supported by the ground surface 300 such that the position or location of such a surface does not change with the loading of the vehicle 12, but remains constant. This measurement can then be taken by the portable measuring device 100 for the first, second, and third measurements (unloaded, loaded and weight distributed), to determine the percent weight distribution of the trailer 10 over the axles of the to vehicle 12, using the method described above.

The location on the tow vehicle 12 where the portable measuring device is held to take the measurements, must be the same location for each of the three measurements (unloaded, loaded and weight distributed), but the location itself can vary and include the driver side wheel well, passenger side wheel well, front fender, front bumper, or any other desired location on the tow vehicle 12 that is connected above the chassis or axles of the tow vehicle 12, because any location on substantially the front half of the tow vehicle will change position relative to the ground 300, depending on the percent weight distribution.

Figure 5:
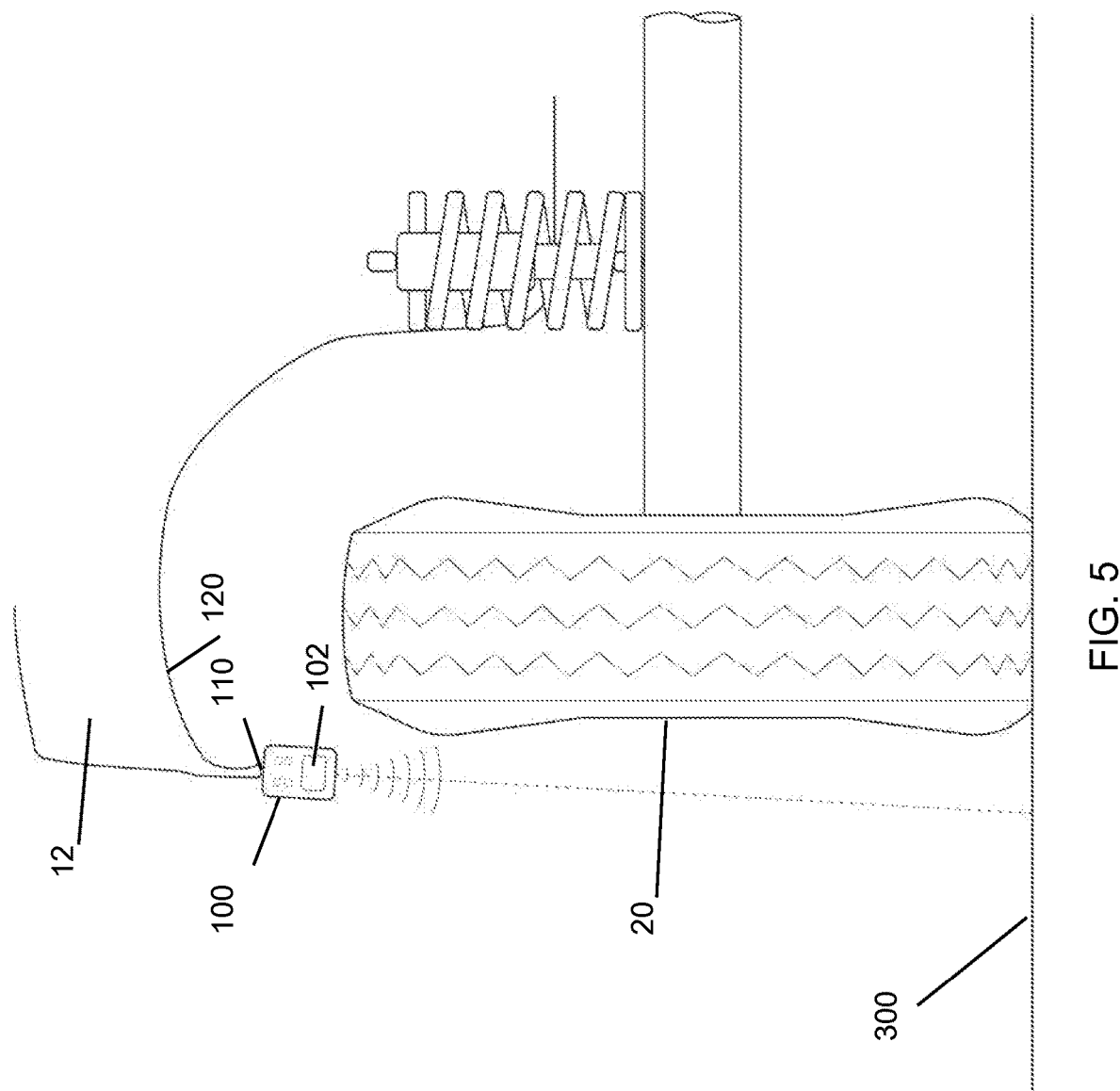
FIG. 5 is front view of another embodiment of a disclosed portable measuring device attached at a fixed position on the vehicle.

Referring to FIG. 5, in another disclosed embodiment, the portable measuring device 100 may be removably or permanently attached at a location on a front end of the tow vehicle 12, for example, at an interior location on the wheel well 120. The portable measuring device may include any desired attachment mechanism 110, for example, a magnet, suction cup, adhesive, or any other know attachment mechanism. The portable measuring device 100 can then be pointed toward the ground 300, or at another desired location in contact with the ground 300, or at any surface supported by the ground 300 such that the position or location of such a surface does not change with the loading of the vehicle 12, but remains constant, to measure the distance between the location on the wheel well 120 and the ground 300. This measurement can then be taken by the portable measuring device 100 for the first, second, and third measurements (unloaded, loaded and weight distributed), to determine the percent weight distribution of the trailer 10 over the axles of the tow vehicle 12, using the method described above.

The location on the tow vehicle 12 where the portable measuring device is held to take the measurements, must be the same location for each of the three measurements (unloaded, loaded and weight distributed), but the location itself can vary and include the driver side wheel well, passenger side wheel well, front fender, or any other desired location on the tow vehicle 12 that is connected above the suspension or axles of the tow vehicle 12, because any location on substantially the front half of the tow vehicle will change position relative to the ground 300, depending on the percent weight distribution.

Figure 6:
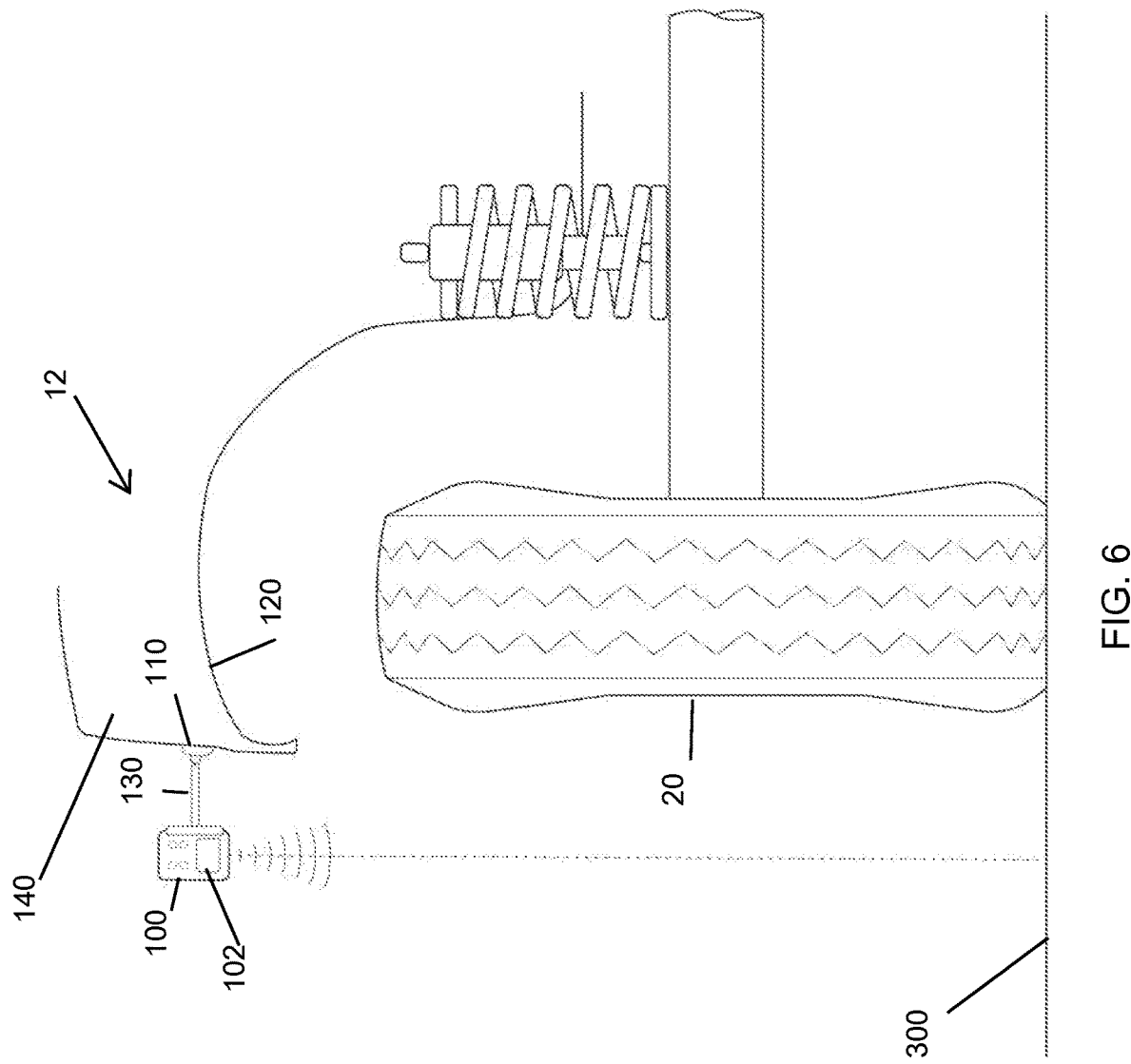
FIG. 6 is front view of a further embodiment of a disclosed portable measuring device positioned at fixed position on the vehicle.

Referring to FIG. 6, in another disclosed embodiment, the portable measuring device 100 may be removably attached at a location on a front end of the tow vehicle 12, for example, at an exterior location 140 above the wheel well 120. The portable measuring device 100 may include any desired attachment holder 130 which can hold and support the portable measuring device 100 and also include an attachment mechanism 110, for example, a magnet, suction cup, adhesive, or any other know attach mechanism. The portable measuring device 100 can then be pointed toward the ground 300, or other suitable surface, such as any surface supported by the ground 300 such that the position or location of such a surface does not change with the loading of the vehicle 12, but remains constant, to measure the distance between the exterior location 140 and the ground 300. This measurement can then be taken by the portable measuring device 100 for the first, second, and third measurements (unloaded, loaded and weight distributed), to determine the percent weight distribution of the trailer 10 over the axles of the to vehicle 12, using the method described above.

The location on the tow vehicle 12 where the portable measuring device is held to take the measurements, must be the same location for each of the three measurements (unloaded, loaded and weight distributed), but the location itself can vary and include the driver side wheel well, passenger side wheel well, front fender, or any other desired location on the tow vehicle 12 that is connected above the suspension or axles of the tow vehicle 12, because any location on substantially the front half of the tow vehicle will change position relative to the ground 300, depending on the percent weight distribution.

Figure 7:
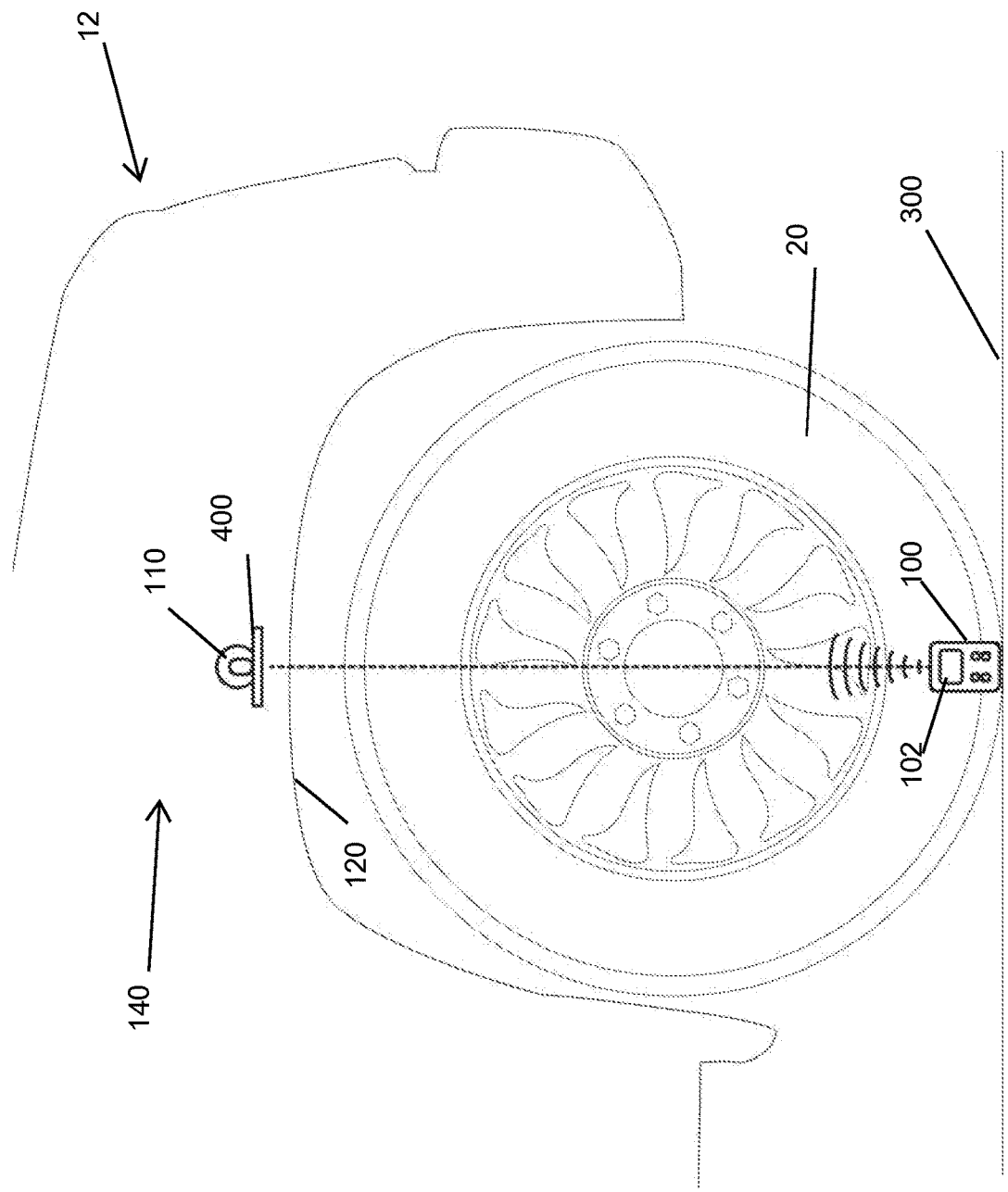
FIG. 7 is side view of another embodiment of a disclosed portable measuring device positioned at fixed position off the vehicle.

Referring to FIG. 7, in another disclosed embodiment, the portable measuring device 100 may be positioned on the ground 300 or on any surface supported by the ground 300 such that the position or location of such a surface does not change with the loading of the vehicle 12, but remains constant, adjacent to the front wheel 20 and oriented to measure the distance between the ground 300 and a removable measuring surface 400 that can be removably attached at a location on a front end of the tow vehicle 12, for example, at an exterior location 140 above the wheel well 120. The removeable measuring surface 400 may include any desired attachment mechanism 110, for example, a magnet, suction cup, adhesive, or any other known attachment mechanism. The portable measuring device 100 can then be pointed toward the measuring surface 400, or the vehicle 12 itself, to measure the distance between the location on the exterior location 140 and the ground 300 or any surface supported by the ground surface 300 such that the position or location of such a surface does not change with the loading of the vehicle 12, but remains constant. This measurement can then be taken by the portable measuring device 100 for the first, second, and third measurements (unloaded, loaded and weight distributed), to determine the percent weight distribution of the trailer 10 over the axles of the to vehicle 12, using the method described above.

The location where the portable measuring device 100 is held or positioned, to take the measurements, must be the same location for each of the three measurements (unloaded, loaded and weight distributed), but the location itself can vary and include the ground 300 or a surface supported by the ground 300, at or around the driver side wheel well, the passenger side wheel well, front fender, or any other desired location on the tow vehicle 12 that is connected above the suspension or axles of the tow vehicle 12, because any location on substantially the front half of the tow vehicle will change position relative to the ground 300, depending on the percent weight distribution.

Referring to FIG. 8, in another disclosed embodiment, the portable measuring device 100 may be positioned at a location on a top surface of the front wheel 20 of the tow vehicle 12, or on any surface supported by the ground 300 such that the position or location of such a surface does not change with the loading of the vehicle 12, but remains constant, and pointed in a direction toward an interior location on the wheel well 120. The portable measuring device 100 can then be pointed toward the interior location on the wheel well 120 to measure the distance between the location on the wheel well 120 and the top surface of the wheel 20. This measurement can then be taken by the portable measuring device 100 for the first, second, and third measurements (unloaded, loaded and weight distributed), to determine the percent weight distribution of the trailer 10 over the axles of the to vehicle 12, using the method described above.

The location on the tow vehicle 12 where the portable measuring device is held to take the measurements, must be the same location for each of the three measurements (unloaded, loaded and weight distributed), but the location itself can vary and include the driver wheel, passenger side wheel, or any other desired location on the tow vehicle 12 that is connected to a member or element attached below the suspension or axles of the tow vehicle 12, and the portable measuring device can then be pointed to a location above the chassis or axles of the tow vehicle 12 because any location on substantially the front half of the tow vehicle 12 will change position relative to the wheels, axles and chassis, depending on the percent weight distribution.

The term "measuring device," as used herein, shall each be construed broadly to cover any device, now known or later discovered, capable of measuring, or determining a linear distance.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

ADDITIONAL SPECIFICATION SUPPORT

1. A weight distribution measurement system, including:
a portable measuring device configured to measure a linear distance and store a plurality of measurements,
wherein the portable measuring device is configured to measure a first distance between a first location on a vehicle above an axle of the vehicle and a second location, wherein the first distance is measured prior to loading the vehicle;
wherein the portable measuring device is configured to measure a second distance between the first location and the second location, wherein the second distance is measured after loading a vehicle,
wherein the portable measuring device is configured to measure a third distance between the first location and the second location, wherein the third distance is measured after loading a vehicle and engagement of a weight distribution device,
wherein the portable measuring device is configured to calculate the percent weight distribution over the axles of the vehicle using the portable measuring device,
wherein the portable measuring device is configured to display the percent weight distribution.
2. The system of embodiment 1, wherein the measuring device includes an attachment mechanism configured to removably attach the measuring device to a vehicle.
3. The system of embodiment 2, wherein the attachment mechanism is a magnet.
4. The system of embodiment 2, wherein the attachment mechanism is a suction cup.
5. The system of embodiment 1, wherein the measuring device includes a laser measuring implement.
6. The system of embodiment 1, wherein the measuring device includes an infrared measuring implement.
7. The system of embodiment 1, wherein the measuring device includes an ultrasonic measuring implement.
8. The system of embodiment 1, wherein the measuring device includes a visual display configured to show the percent weight distribution.
9. The system of embodiment 1, wherein the measuring device is configured to electronically communicate with an electronic device.
10. A method of determining weight distribution, including:
providing a portable measuring device configured to measure a linear distance and store a plurality of measurements;
measuring a first distance between a first location on a vehicle and a second location, wherein the first distance is measured prior to loading the vehicle;
measuring a second distance between the first location and the second location, wherein the second distance is measured after loading a vehicle,
measuring a third distance between the first location and the second location, wherein the third distance is measured after loading a vehicle and engaging a weight distribution mechanism,
calculating the percent weight distribution over the axles of the vehicle using the portable measuring device,
displaying the percent weight distribution.
11. The method of embodiment 10, wherein the loading of the vehicle includes coupling a trailer to the vehicle.
12. The method of embodiment 10, wherein the first location is within a wheel well of the vehicle and the second location is a ground surface supporting the vehicle.
13. The method of embodiment 10, wherein the first location is on an exterior location of the vehicle and the second location is a ground surface supporting the vehicle.
14. The method of embodiment 10, wherein the first location on a top surface of a wheel of the vehicle and the second location is within a wheel well of the vehicle.
15. The method of embodiment 10, wherein the first location is on a ground surface supporting the vehicle and second location is a measuring surface attached to an exterior location of the vehicle.
16. The method of embodiment 10, wherein the measuring device includes a visual display configured to show the percent weight distribution.
17. The method of embodiment 10, wherein the measuring device sends data to an electronic device.
18. The method of embodiment 10, wherein the measuring device includes a laser measuring implement.
19. The method of embodiment 10, wherein the measuring device includes an infrared measuring implement.
20. The method of embodiment 10, wherein the measuring device includes an ultrasonic measuring implement.

What is claimed is:

1. A weight distribution measurement system, comprising:
a portable measuring device configured to measure a linear distance and store a plurality of measurements;
wherein the portable measuring device is configured to measure a first distance between a first location on a vehicle supported by an axle of the vehicle and a second location either on a ground surface supporting the vehicle or on a surface supported by the ground surface, wherein the first distance is measured prior to loading the vehicle;
wherein the portable measuring device is configured to measure a second distance between the first location and the second location, wherein the second distance is measured after loading a vehicle;
wherein the portable measuring device is configured to measure a third distance between the first location and the second location, wherein the third distance is measured after loading a vehicle and engagement of a weight distribution device;
wherein the portable measuring device is configured to use the first distance, the second distance, and the third distance to calculate the percent weight distribution over the axles of the vehicle using the portable measuring device; and
wherein the portable measuring device is configured to display the percent weight distribution.

2. The system of claim 1, wherein the portable measuring device includes an attachment mechanism configured to removably attach the measuring device to a vehicle.

3. The system of claim 2, wherein the attachment mechanism is a magnet.

4. The system of claim 2, wherein the attachment mechanism is a suction cup.

5. The system of claim 1, wherein the portable measuring device includes a laser measuring implement.

6. The system of claim 1, wherein the portable measuring device includes an infrared measuring implement.

7. The system of claim 1, wherein the portable measuring device includes an ultrasonic measuring implement.

8. The system of claim 1, wherein the portable measuring device includes a visual display configured to show the percent weight distribution.

9. The system of claim 1, wherein the portable measuring device is configured to electronically communicate with an electronic device.

10. The system of claim 1, wherein the portable measuring device is configured to calculate the percent weight distribution over the axles of the vehicle using the portable measuring device by using the following formula: the percent weight distribution=(the second distance−the third distance)/(the second distance−the first distance).

11. A method of determining weight distribution, comprising:
providing a portable measuring device configured to measure a linear distance and store a plurality of measurements;
measuring a first distance between a first location on a vehicle supported by an axle of the vehicle and a second location either on a ground surface supporting the vehicle or on a surface supported by the ground surface, wherein the first distance is measured prior to loading the vehicle;
measuring a second distance between the first location and the second location, wherein the second distance is measured after loading a vehicle;
measuring a third distance between the first location and the second location, wherein the third distance is measured after loading a vehicle and engaging a weight distribution mechanism;
using the first distance, the second distance, and the third distance to calculate the percent weight distribution over the axles of the vehicle using the portable measuring device; and
displaying the percent weight distribution.

12. The method of claim 11, wherein the loading of the vehicle includes coupling a trailer to the vehicle.

13. The method of claim 11, wherein the first location is a wheel well of the vehicle.

14. The method of claim 11, wherein the first location is on an exterior location of the vehicle and the second location is a ground surface supporting the vehicle.

15. The method of claim 11, wherein the second location on a top surface of a wheel of the vehicle and the first location is within a wheel well of the vehicle.

16. The method of claim 11, wherein the first location is a measuring surface attached to an exterior location of the vehicle.

17. The method of claim 11, wherein the portable measuring device includes a visual display configured to show the percent weight distribution.

18. The method of claim 11, wherein the portable measuring device sends data to an electronic device.

19. The method of claim 11, wherein the portable measuring device includes a laser measuring implement.

20. The method of claim 11, wherein the portable measuring device includes an infrared measuring implement.

21. The method of claim 11, wherein the portable measuring device includes an ultrasonic measuring implement.

22. The method of claim 11, wherein the using of the first distance, the second distance, and the third distance to calculate the percent weight distribution over the axles of the vehicle, further comprises using the following formula: the percent weight distribution=(the second distance−the third distance)/(the second distance−the first distance).

* * * * *